Sept. 21, 1954  R. H. WISE  2,689,749
FENDER SHIELD
Filed May 22, 1952  2 Sheets-Sheet 1

RALPH H. WISE
INVENTOR.

BY E.C. McRae
J. R. Faulkner
L. H. Oster
ATTORNEYS

Sept. 21, 1954 R. H. WISE 2,689,749
FENDER SHIELD
Filed May 22, 1952 2 Sheets-Sheet 2

RALPH H. WISE
INVENTOR.

BY E. C. McRae
J. R. Faulkner
D. H. Oster

ATTORNEYS

Patented Sept. 21, 1954

2,689,749

UNITED STATES PATENT OFFICE 2,689,749

FENDER SHIELD

Ralph H. Wise, Wayne, Mich., assignor to Ford Motor Company, Dearborn, Mich., a corporation of Delaware Application May 22, 1952, Serial No. 289,238

6 Claims. (Cl. 280—153)

This invention relates generally to fender shields for motor vehicles, and particularly to the mounting of such fender shields upon the fender walls of a vehicle to cover the wheel access openings therein.

An object of the present invention is to provide a fender shield which may be readily mounted upon the vehicle fender wall, and easily detached therefrom to provide access to the wheel, and which is securely held in the proper position in a rattle free manner.

Another object of the present invention is to provide a fender shield construction suitable for use in connection with vehicles which are particularly designed for factory installation of fender shields, as well as for vehicles which may be used either with or without fender shields at the customer's option. For vehicles designed for factory installation of fender shields, the fender wall of the vehicle is provided with an inwardly offset marginal flange adjacent the wheel opening for receiving and locating the fender shield, and is also provided with factory installed fasteners on the inner portions of the fender wall so that the fender shield need only carry small retainers. For vehicles to which fender shields may be attached at customer option, fasteners may be supported in mounting brackets which can be easily attached to the fender walls at the time of installation of the fender shield, with the brackets forming locating means for the fender shield as well as supporting the fasteners for engagement with retainers carried by the fender shield on the inner side thereof.

Other objects and advantages of the present invention will be apparent as this description proceeds, particularly when considered in connection with the accompanying drawings, wherein.

Figure 1:
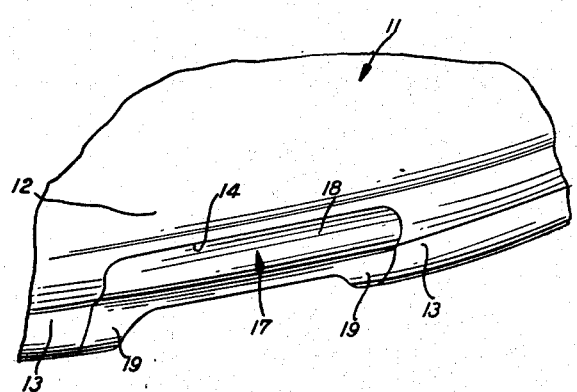
Figure 1 is a perspective view of a portion of a vehicle fender with a fender shield attached thereto.
Figure 2:
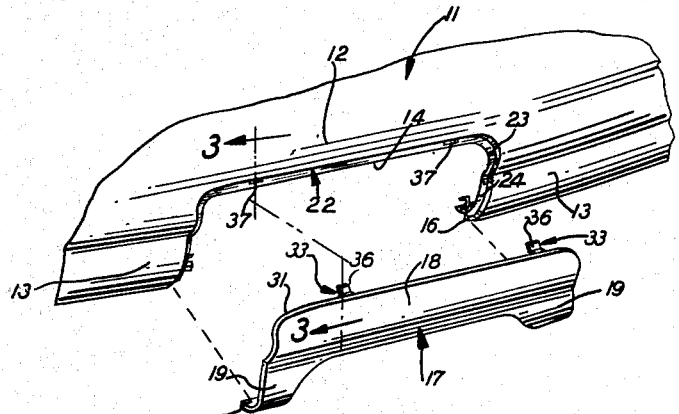
Figure 2 is a perspective similar to Figure 1, but showing the fender shield in a detached position.

Referring now to the drawings, and particularly to Figures 1 and 2, the reference character 11 indicates a vehicle fender wall adjacent the rear wheels of the vehicle. The fender wall 11 has an upper generally vertically extending portion 12 which continues downwardly and merges into an integral inwardly curved lower portion 13 on each side of the wheel access opening 14. The inwardly curved portions 13 of the fender wall terminate in a substantially horizontal inwardly extending marginal flange 16.

The wheel access opening 14 is adapted to be partially closed by a fender shield 17 having a generally vertically extending flat upper portion 18 conforming in shape to the adjacent portion 12 of fender wall, and inwardly curved lower portions 19 corresponding in shape to the adjacent inwardly curved portions 13 of the fender wall so as to form a smooth continuation thereof when the shield is attached to the vehicle. The downwardly extending inwardly curved portions 19 of the fender shield terminate in substantially horizontal inwardly extending marginal flanges 21.

Figure 6:
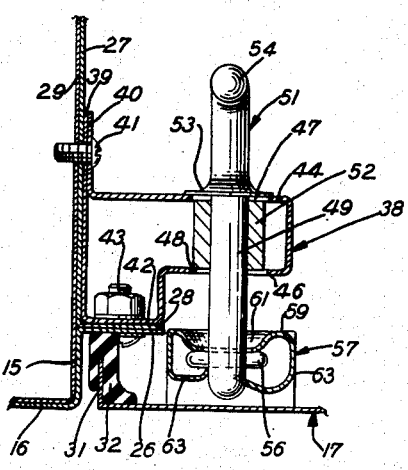
Figure 6 is an enlarged cross-sectional view through the attachment means of the construction shown in Figure 4.
Figure 4:
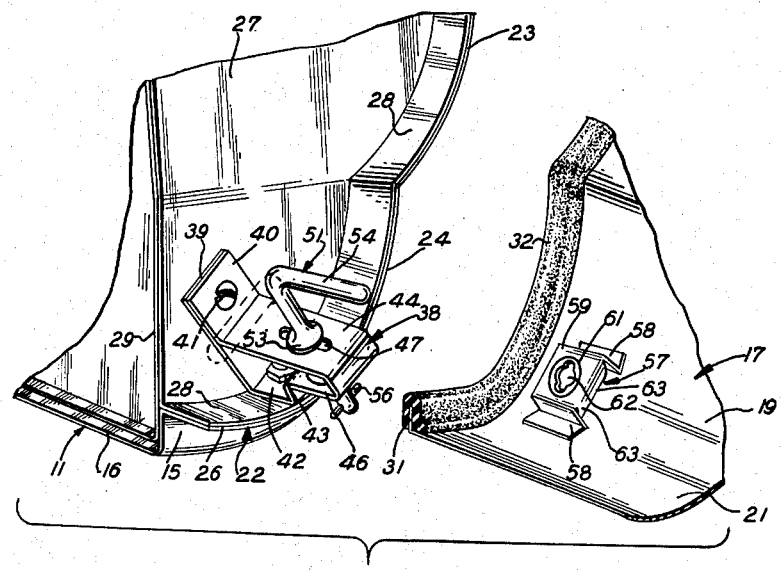
Figure 4 is an enlarged perspective view of a portion of the fender shield and the adjacent part of the vehicle fender, as seen from a position inwardly of the fender shield, and illustrating particularly the attachment means therefor.
Figure 9:
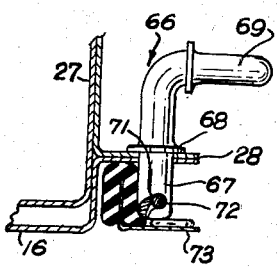
Figure 9 is an enlarged cross sectional view through the attachment means of Figure 5.

Reference is now made particularly to Figures 4 and 6 for a more detailed description of the vehicle construction adjacent the wheel access opening 14. Adjacent the wheel opening 14 the fender wall 11 is bent inwardly at right angles to form an intermediate portion 15 extending at right angles to the fender wall and is then bent again at right angles to form an inwardly offset marginal flange 22. The inwardly offset flange 22 has portions 23, 24 and 26 extending generally parallel to the correspondingly shaped portions 12, 13 and 16 of the fender wall 11. A reinforcing panel 27 forms a wheelhouse and has a marginal flange 28 corresponding in shape to and suitably secured to the inwardly offset marginal flange 22 of the fender wall 11. Reinforcing the assembly is an inner panel 29 suitably secured to the bottom flange 16 of the fender wall and to the wheelhouse panel 27.

The fender shield 17 is provided along its front and rear edges and its upper edge with an inturned marginal flange 31 normal to the panel.

The width of this flange is less than the distance from the outer surface of the fender wall 11 to the inwardly offset flange 22 thereof. A resilient rubber weather strip 32, generally U-shaped in cross section, is mounted upon the flange 31 of the fender shield and is arranged so that when it is seated upon the offset marginal flange 22 of the fender wall the outer surface of the fender shield will be positioned flush with the adjacent surfaces of the fender wall. The over-all dimensions of the fender shield are, of course, slightly smaller than the corresponding dimensions of the opening 14 in the fender wall so as to provide clearance therebetween to enable the fender shield to be assembled in the opening. The outer flange of the rubber weather strip 32 prevents metal to metal contact between the marginal flange 31 of the fender shield and the adjacent intermediate portion 15 of the fender wall.

Figure 3:
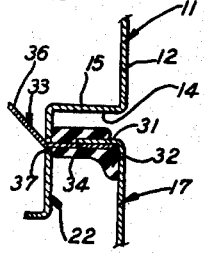
Figure 3 is an enlarged cross-sectional view taken on the plane indicated by the line 3—3 of Figure 2, with the fender shield attached to the fender wall of the vehicle.

Interlocking means are provided between the upper edge of the fender shield 17 and the corresponding edge of the fender wall adjacent the wheel opening 14. As best seen in Figures 2 and 3, a pair of anchoring lugs 33 are provided. Each lug has a laterally extending flange 34 spot-welded to the adjacent portion of the inturned flange 31 of the fender shield, and an upwardly and inwardly inclined flange 36. The inclined flange 36 is adapted to project through elongated slots 37 formed in the intermediate portion 15 of the fender wall.

In assembling the fender shield to the vehicle, the shield is tilted so as to facilitate the entry of the inclined flanges 36 of the lugs 33 through the elongated slots 37. The fender shield is then swung downwardly to its assembled position, and it will be apparent that the inclined flanges 36 of the lugs 33 thereafter prevent outward displacement of the fender shield relative to the vehicle body along the upper edge of the shield.

Reference is now made to Figures 4 and 6 for a disclosure of one of the fasteners securing the lower portions 19 of the fender shield to the body. The reference character 38 indicates a box-shaped mounting bracket having marginal flanges 39 and 40 secured by means of a sheet metal screw 41 to the adjacent wheelhouse panel 27 and the inner panel 29. The base 42 of the bracket 38 rests upon the marginal flange 28 of the wheelhouse panel 27 and is secured thereto by means of a bolt 43 which also passes through the inwardly offset marginal flange 22 of the fender wall.

The upper and intermediate walls 44 and 46 respectively of the mounting bracket 38 are provided with longitudinally extending aligned slots 47 and 48 respectively for receiving the shank 49 of the fastener 51. A spacing collar 52 encircles the shank 49 between the walls 44 and 46 of the mounting bracket to support the latter. The upper end of the shank 49 of the fastener is provided with an integral enlarged flange 53 resting upon the upper wall 44 of the bracket and merging into an integral L-shaped operating handle 54. The projecting opposite end of the shank 49 of the fastener 51 is apertured to receive a locking pin 56 projecting through the shank 49 and extending beyond the opposite sides thereof. This locking pin is adapted to engage a retainer upon the fender shield, as more fully described hereinafter.

It will be noted from an inspection in Figure 4 that the mounting bracket 38 supporting the fastener 51 is mounted at an angle to the vertical at an intermediate portion of the inwardly curved part 24 of the offset flange 22 of the fender wall. A retainer 57 is mounted upon the inner surface of the fender shield 17 in alignment with the shank 49 of the fastener 51 when the shield is assembled to the vehicle. The retainer 57 is a conventional type and is provided with flanges 58 suitably welded to the fender shield. The base 59 of the retainer has a depressed portion 61 and with an opening 62 therein of such shape to receive not only the shank 49 of the fastener but also the locking pin 56 thereof. The side flanges 63 of the retainer are bent inwardly and form cam surfaces engaging the locking pin 56 and locking it in place when the handle 54 of the fastener 51 has been rotated through a ninety degree angle. In the unlocked position of the fastener the handle 54 extends generally longitudinally so that the locking pin 56 will be in alignment with the elongated part of the opening 62 in the retainer 57. This enables the shank 49 of the fastener to be inserted into the retainer until the locking pin 56 is positioned beneath the base 59. The elongated slots 47 and 48 in the mounting bracket 38 permit adjustment of the fastener 51 to enable it to be properly aligned with the retainer 57.

After the lugs 33 have been inserted through the openings 37 in the offset flange 22 of the fender wall, the fender shield is then rotated downwardly until the locking pins 56 on the fasteners 51 are inserted into the retainers 57 and the locking and clamping action is completed simply by turning the handles 54 of the fasteners through angles of ninety degrees. The engagement of the fasteners 51 with the retainers 57 securely clamps the fender shield 17 in place with the marginal edges of the rubber sealing strip 32 in engagement with the adjacent offset flange 22 of the fender wall. It will be apparent that with the mounting brackets 38 and fasteners 51 mounted in the inclined positions shown in Figure 2, the fender shield is firmly held in position against the offset marginal flange 22 and clamped against both downward and outward displacement therefrom. If desired, the mounting brackets 38 and the fasteners carried thereby may be mounted upon the substantially horizontal inner marginal flange 26 of the offset flange 22.

Figure 5:
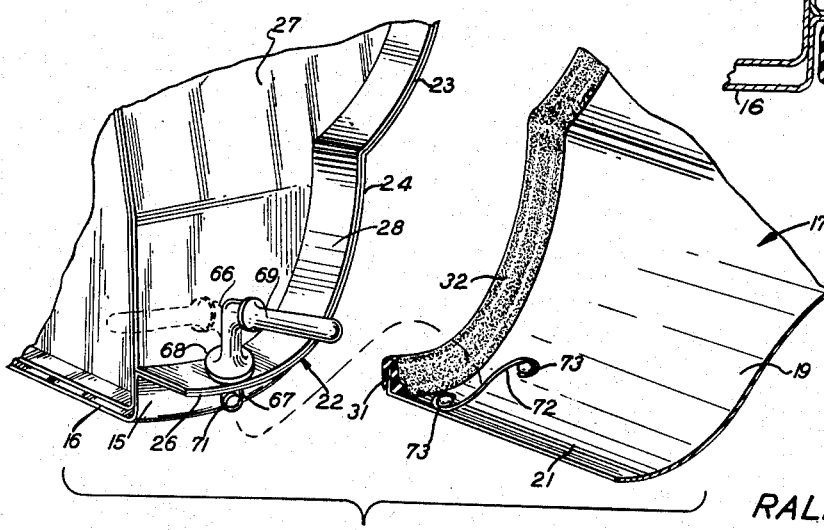
Figure 5 is a perspective view similar to Figure 4 but showing modified attachment means.

Reference is now made to Figure 5 which illustrates a modified type of fastener 66. This fastener is of a conventional type and comprises a shank 67 projecting through aligned openings in the marginal flange 28 of the wheelhouse panel 27 and the inner horizontal flange 26 of the offset flange 22. The fastener 66 is formed with an integral enlarged flange 68 seated against the marginal flange 28 of the wheelhouse panel and merging into an L-shaped operating handle 69. The projecting shank 67 of the fastener is provided with a cam slot 71 adapted to engage a wire retainer 72 mounted upon the inner surface of the fender shield 17 in alignment therewith. The wire retainer 72 is generally S-shaped and has looped ends 73 rivet welded to the fender shield. The fender shield is assembled to the vehicle by first engaging the lugs at the upper edge thereof with the corresponding slots in the body. The subsequent swinging movement of the fender shield downwardly engages the wire retainers 72 in the cam slots 71 in the fasteners and rotation of the handles 69 of the fasteners tension the wire retainers 72 and clamps the fender shield firmly against the inwardly offset flange 22 of the fender wall. The fastener 66 is shown as mounted in a vertical position, but it could, if desired be mounted in an inclined position similar to the fastener 51 of Figure 4.

Figures 1 to 6 inclusive, described above, illustrate the fender shield in conjunction with a vehicle body the fender panel of which is particularly designed for use in conjunction with a fender shield. For example, certain higher priced vehicles may be equipped with fender shields at the factory and the fender panels formed as shown to provide a continuous inwardly offset marginal flange 22 along the sides of the wheel access opening 14. This flange is not objectionable from an appearance standpoint since it is always concealed by the fender shield. In certain lower priced vehicles, however, it may be desired to provide fender shields only as a customer option, and such a flange might be objectionable from the appearance standpoint when fender shields were not used.

Figure 8:
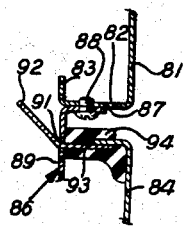
Figure 8 is a cross-sectional view similar to Figure 3, but showing a modification thereof.
Figure 7:
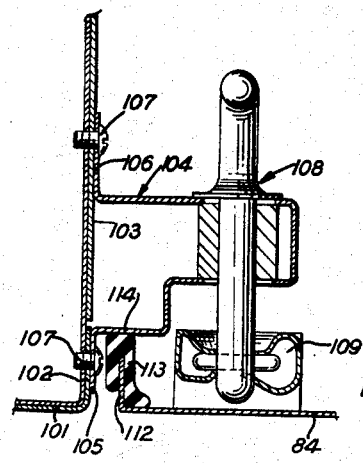
Figure 7 is a cross-sectional view similar to Figure 6, but showing another modification thereof.

Figures 7 and 8 illustrate the manner in which the fender shield construction of the present invention can be used with vehicles of this type in which an inwardly offset flange is not integrally formed upon the fender panel.

Referring now to Figure 7, the fender panel 81 is provided with an inturned flange 82 extending normal thereto and terminating in an upwardly rolled edge 83. To provide a support for the upper edge of the fender shield 84, spaced angle brackets 86 may be provided with their upper flanges 87 secured by bolts 88 to the flange 82 of the fender panel at the time of initial installation of a fender shield to the vehicle. The downwardly depending flange 89 of the bracket 86 is formed with an elongated slot 91 for receiving the inner inclined portion 92 of a lug 93 welded to the upper flange of the fender shield 84. A resilient weather strip 94 having a length sufficient to cover the width of the bracket 86 is provided to prevent a metal to metal contact.

With reference now to Figure 8, it will be noted that the fender panel 101 has an inturned flange 102 in alignment with the flange 103 of the wheelhouse. The mounting bracket 104 is similar to the mounting bracket 38 of Figure 6 but, however, is provided with a downwardly depending flange 105 as well as an upwardly extending flange 106, each being secured to the adjacent body structure by bolts 107. A fastener 108 identical to fastener 51 is supported upon the mounting bracket 104 and engages a retainer 109 secured to the inner surface of the fender shield 84. The inner inwardly extending marginal flange 112 of the fender shield supports a short rubber sealing strip 113 of a width sufficient to engage the lower wall 114 of the mounting bracket 104 throughout its entire width.

It will be seen that with the embodiment of the invention shown in Figures 7 and 8, the fender shield is supported upon the body at four points, namely the two points along the upper edge of the fender shield at which the lugs 93 on the shield engage the brackets 86 secured to the fender panel and the two points at the lower corners of the shield at which the fasteners 108 engage the retainers 109 on the shield. At these four points suitable rubber weather strips are utilized to prevent metal to metal contact. The brackets 86 and the mounting brackets 104 are suitable for attachment to the body at the time of original installation of a fender shield thereto, and can be omitted if fender shields are not utilized. In the event the fender shields are later permanently removed, the brackets can also readily be detached.

It will be understood that the invention is not to be limited to the exact construction shown and described, but that various changes and modifications may be made without departing from the spirit and scope of the invention, as defined in the appended claims.

What is claimed is:

1. A fender shield for a vehicle fender having a downwardly depending generally vertical outer wall formed with a wheel access opening therein and with the portions of the fender wall on opposite sides of the wheel opening being gradually curved inwardly and terminating in substantially horizontal marginal portions, comprising a sheet metal shield having a marginal edge overlapping the edges of the fender wall along the wheel opening and conforming in shape to said edges of the fender wall, a resilient sealing strip between the overlapped edges of said fender wall and said fender shield, interlocking means between the upper edge of the shield and the adjacent portion of the fender wall to prevent outward displacement of the upper portion of said shield away from said wall, a pair of mounting brackets carried by the inwardly curved portions of the fender wall on opposite sides of the wheel opening adjacent the edges thereof, said brackets having portions projecting into the wheel access opening through the marginal edges of the fender wall on opposite sides of the wheel opening, a fastener carried by the projecting portion of each of said mounting brackets, and retainers mounted upon the inner surface of said fender shield in position to be engaged by said fasteners, said retainers being located wholly within the boundaries of the fender shield so as to be completely concealed by said fender shield when the latter is in place and said fasteners exerting a generally upward tensioning force upon the lower portions of said shield to support said shield against downward displacement and to clamp the sealing strip between the fender wall and fender shield.

2. A fender shield for a vehicle fender having a downwardly depending generally vertical outer wall formed with a wheel access opening therein and with the portions of the fender wall on opposite sides of the wheel opening being curved inwardly in a downward direction and terminating in substantially horizontal marginal portions and said fender wall also having a narrow flange extending parallel to but offset inwardly from the outer surface of the wall and projecting into the wheel access opening, comprising a sheet metal shield having an inturned marginal flange along its side and upper edges, said marginal flange extending at right angles to the surface of the shield and having a width slightly less than the amount of the inward offset of the said flange on the fender wall, said fender shield having an upper generally vertically extending portion and a lower inwardly curved portion terminating in a substantially horizontal marginal portion all corresponding in shape to the portions of the adjacent fender wall so that the shield when attached to the fender wall forms a smooth continuation thereof, a U-shaped resilient sealing strip embracing the inturned marginal flange of the shield to provide resilient engagement between the inturned marginal flange of the shield and the inwardly offset flange of the fender wall, a pair of mounting brackets mounted upon the inwardly curved portions of the inwardly offset flange of the fender wall and projecting into the wheel access opening beyond the marginal edges of the fender, a fastener carried by the projecting portion of each bracket, each of fasteners having a latching portion extending through said inwardly offset flange and projecting outwardly therefrom and a manually operable handle portion on the inner side of said last mentioned flange, and a pair of retainers mounted upon the inner surface of said fender shield adjacent the lower corners thereof and wholly within the boundaries of the shield in position to be engaged by the latch portions of said fasteners and to be clamped thereto upon rotation of the handle portions of said fasteners, the clamping engagement between said fasteners and said retainers exerting a generally upward clamping force upon the lower portions of said fender shield to prevent displacement of said shield from said fender, and interlocking means between the inturned marginal edge of said shield and the adjacent inwardly offset flange of said fender wall adjacent the upper edge of said wheel opening to prevent outward displacement of the upper portion of said shield from said wall.

3. The structure defined by claim 2 which is further characterized in that said interlocking means comprises a lug secured to the inturned marginal flange of said fender shield adjacent the upper portion of said shield, said lug extending inwardly therefrom and having an upwardly inclined terminal portion, and an opening formed in the inwardly offset flange of said fender wall adjacent the upper portion of said wheel opening in alignment with said lug to receive the upwardly inclined terminal portion of the lug and to prevent outward movement of said fender shield relative to said fender wall in this area.

4. The structure defined by claim 2 which is further characterized in that said fasteners extend through the substantially horizontal marginal portion of the inwardly offset flange of the fender wall so that the latch portions thereof are generally vertical, the handle portions thereof extending generally at right angles to the latch portions of said fasteners and swinging through an angle of substantially ninety degrees between the latched and unlatched positions with the handle projecting generally parallel to the longitudinal plane of the fender shield in the unlatched position and projecting inwardly at right angles thereto in the latched position.

5. A fender shield for a vehicle fender having a generally vertically extending outer wall formed with a wheel access opening therein and with the portions of the fender wall on opposite sides of the wheel opening being curved inwardly and terminating in an inwardly extending lower marginal portion, comprising a metal shield having a generally vertical extending upper portion and an inwardly curved lower portion each corresponding in shape to the adjacent portions of the fender wall so as to form a smooth continuation thereof when attached to the vehicle, interlocking means between the upper marginal edge of the fender shield and the adjacent edge of the fender wall to prevent lateral displacement of said shield relative to said wall, and a pair of mounting brackets attached to said inwardly curved lower portions of the fender wall at opposite sides of the wheel opening, each of said brackets having a flange projecting into the wheel opening beyond the side marginal edges of the fender and being generally parallel to the outer surface of the fender at this point, rotatable fastening means extending through said mounting brackets each having a retaining portion projecting outwardly therefrom toward said fender shield and a manually operable portion extending inwardly from said bracket, and a pair of retainers mounted upon the inner surface of said fender shield wholly within the marginal boundaries of the shield in alignment with the retaining portions of said fastening means for engagement thereby, the engagement between said fastening means and said retainers supporting the lower portions of said fender shield against displacement relative to said fender wall.

6. A fender shield for a vehicle fender having a downwardly depending generally vertical outer panel formed with a wheel access opening therein and with the portions of the fender panel on opposite sides of the wheel opening being curved inwardly, said fender panel being formed with an inwardly projecting marginal flange normal thereto around the edges of the wheel openings, comprising a sheet metal shield having an inturned marginal flange substantially normal thereto arranged to be positioned adjacent thereto but spaced therefrom the inturned marginal flange of the fender panel, said shield having an outer surface corresponding to the shape of the adjacent fender panel, a pair of spaced brackets mounted upon the inturned marginal flange of the fender panel adjacent the upper portion of the wheel opening, a pair of lugs secured to the inturned marginal flange of the fender shield in alignment with said brackets and adapted to project through openings in said brackets to prevent outward displacement of said fender shield relative to said fender panel, said lugs having upwardly inclined inner flanges, short resilient weather strips embracing said lugs and engaging the adjacent surfaces of said brackets, a pair of mounting brackets each detachably connected to the lower portions of the inturned flange of said fender panel, fasteners rotatably mounted in said mounting brackets and having retaining portions formed thereon, and retainers secured to the inner surface of said fender shield in alignment with the retainable portions of said fasteners for engagement thereby, short resilient weather strips mounted upon the inturned flange of said fender shield adjacent said mounting brackets, and abutment surfaces formed on said mounting brackets in position to be engaged by the short weather strips on said fender shield to locate the latter in position with its outer surface flush with the outer surface of said fender panel.

References Cited in the file of this patent

UNITED STATES PATENTS

| Number | Name | Date |
|---|---|---|
| 438,626 | Kern | Oct. 21, 1890 |
| 1,792,537 | Irwin | Feb. 17, 1931 |
| 2,261,376 | Jandus | Nov. 4, 1941 |
| 2,267,421 | Purdy | Dec. 23, 1941 |
| 2,520,965 | Schatzman | Sept. 5, 1950 |
| 2,621,944 | Schatzman | Dec. 16, 1952 |